July 25, 1967 A. GORSKI 3,333,160

PROXIMITY RESPONSIVE SYSTEM

Filed Feb. 24, 1964 2 Sheets-Sheet 1

INVENTOR.
ALFRED GORSKI
BY [signature]
ATTORNEY

July 25, 1967 A. GORSKI 3,333,160

PROXIMITY RESPONSIVE SYSTEM

Filed Feb. 24, 1964 2 Sheets-Sheet 2

INVENTOR
ALFRED GORSKI
BY Benjamin J. Barish
ATTORNEY

United States Patent Office 3,333,160

Patented July 25, 1967

3,333,160

PROXIMITY RESPONSIVE SYSTEM

Alfred Gorski, Jaffa, Israel, assignor to Water Economy and Research Company Limited, a limited-liability company of Israel Filed Feb. 24, 1964, Ser. No. 346,956
9 Claims. (Cl. 317—146)

The present invention relates to a proximity sensitive system, and particularly to a system sensitive to the proximity of an extraneous object for operating an external device.

There are various applications for such proximity sensitive systems. The one particularly described herein is a system for automatically turning on the water tap when the user's hands are positioned close to the tap, or other specified location, and for automatically turning off the tap when the user's hands are removed. It has been found that, in some cases, as much as 25–30% of water can be saved by utilizing such a system. Among previously known systems of this type is one based on an optical system utilizing a photocell and a light beam which is broken by the presence of the user's hands, and another based on an electronic system utilizing the change in frequency upon the proximity of an extraneous object. In practice, however, these systems were usually not sufficiently reliable, sensitive and stable in operation to gain widespread use.

While the invention is hereinafter described with respect to an application involving automatically turning on and off the water from a water tap, it will be understood that this is but one application of the system, and that it could be used equally well in other types of applications.

Among the objects of the present invention are to provide a proximity sensitive system which is reliable and sensitive in operation, which has stable operating characteristics even with temperature fluctuations, and which is simple in construction and relatively inexpensive to produce and to maintain.

According to the invention, there is provided a system sensitive to the proximity of an extraneous object for operating an external device comprising an electrical circuit including an oscillator and a tank circuit for controlling the frequency of the oscillator, sensing means, or a probe, for sensing the proximity of the extraneous object, and control means responsive to the sensed proximity of the extraneous object and operative to control an external device. The invention is characterized, in its broadest aspect, by the provision of a shunt across the tank circuit, the shunt including a resistor and the probe. In this arrangement, the probe is very sensitive to the proximity of the extraneous object and changes the Q of the tank circuit to produce a change in amplitude in the output of the oscillator, the control means being responsive to the change in output amplitude to operate the external device.

The Q of a tank circuit, as is known, is a comparison of the total power in the circuit to the power dissipated. It is usually expressed as the ratio of the inductive reactance at resonance to the resistance. When the Q increases, the output amplitude of the circuit is increased, and vice versa.

According to another feature of the invention, the oscillator includes a transistor, and the tank circuit is connected between the emitter and base of the transistor. One side of the resistor in the above-mentioned shunt is connected to the juncture between one side of the tank circuit and the imput circuit to the transistor base, and the other side of the resistor is connected to the probe.

By including the probe in a resistance shunt with respect to the tank circuit, the probe is very sensitive for larger distances. It has been found that if this resistor is omitted, this not only decreases the distance over which the probe is sensitive, but also tends to increase the amount of external radiation produced by the system which can disturb other equipment.

Other aspects and features of the invention will become apparent from the following description.

The accompanying drawings illustrate, diagrammatically and by way of example only, two preferred embodiments of the invention. In the drawings.

Figure 1:
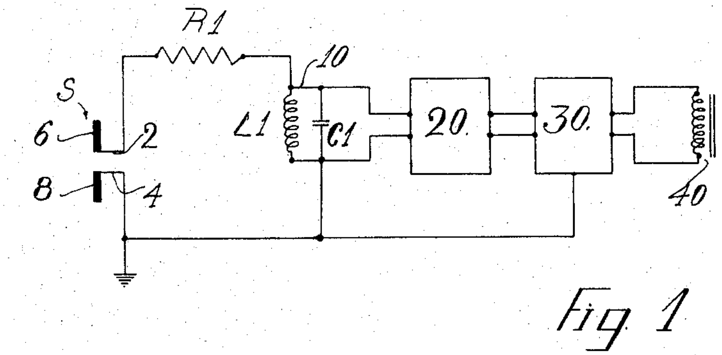
FIG. 1 is a block daigram of a proximity sensitive system constructed in accordance with the invention.

With reference to FIG. 1, the novel system comprises a resonant tank circuit 10, including an inductance L1 and a capacitor C1, the tank circuit controlling the frequency of an oscillator 20. The output of oscillator 20 is coupled to an electronic switch or amplifier 30 which controls a solenoid 40 so that current flows through the solenoid when switch 30 is actuated.

In shunt with the tank circuit 10 is a resistor R1 and the sensing element S which senses the proximity of the extraneous object to actuate the electronic switch 30 to pulse solenoid 40.

The sensing means S is in the form of a capacitive probe having a pair of electrodes spaced from each other and therefore having a capacitance therebetween. The two electrodes are generally indicated by the reference numerals 2 and 4, respectively. When the extraneous object whose proximity is being sensed approaches the two electrodes 2 and 4, the capacitance between these electrodes increases, and therefore the capacitive reactance of the shunt circuit increases. This decreases the impedance of the shunt. A shunt of decreased impedance across the tank circuit 10 decreases the output amplitude and the Q of the circuit. This causes the output amplitude of oscillator 20 to be decreased, this decrease in output being sensed by electronic switch 30 to actuate solenoid 40.

For purposes of increasing the sensitivity of the system, electrodes 2 and 4 of the sensing element S are provided with enlarged surface areas 6 and 8, respectively.

Figure 2:
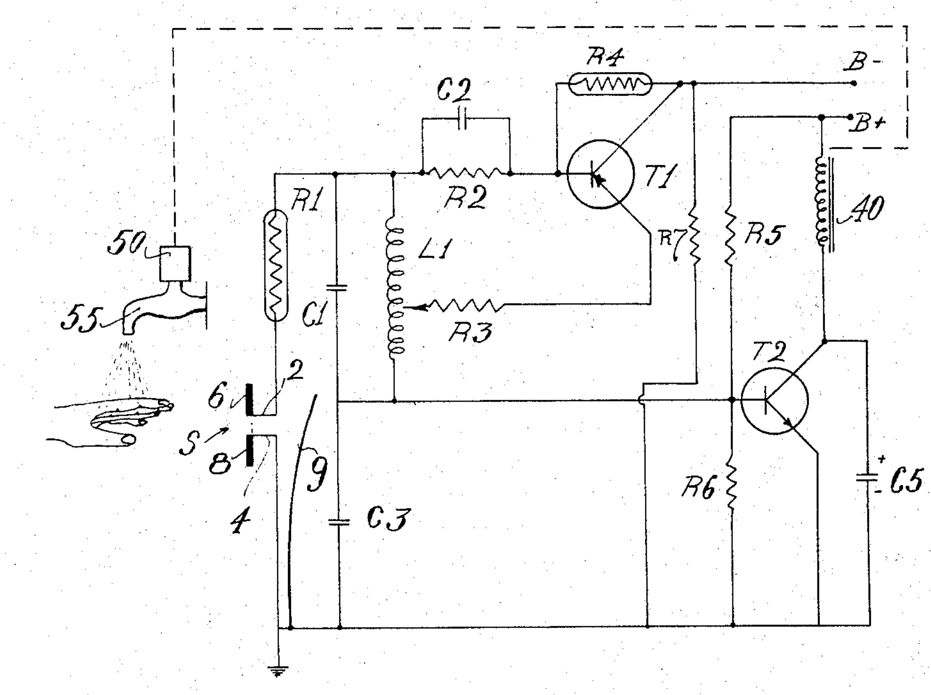
FIG. 2 is a circuit diagram of a system, such as the one in FIG. 1, for use in controlling a water tap in response to the proximity of the user's hand.

The circuit of FIG. 2 illustrates a practical circuit and application of this system. In FIG. 2, the system is used for operating a valve 50 for turning on and off a water tap 55 in response to placing the user's hand in a specified location or area as sensed by sensing element S.

The oscillator used in the system of FIG. 2 is a Hartley oscillator commonly used for the production of R-F signals. The frequency of the oscillations is determined by the L–C constant of the resonant tank circuit including inductance L1 and capacitance C1. The oscillator includes a PNP transistor T1, the collector of which is connected to minus terminal B—. Its emitter is connected to a resistor R3, then to a tap on inductance L1, and then to plus terminal B+ through a resistor R5. Bias for transistor T1 is provided by base current through resistor R2 and capacitor C2. In shunt with the tank circuit L1, C1 is the sensing element S for sensing the proximtiy of the user's hand, this sensing element including, as in FIG. 1, two spaced electrodes 2 and 4 having enlarged surface areas 6 and 8, respectively. One of the electrodes 4 is connected to ground, and the other electrode 2 is connected to resistor R1, the other end of which resistor is connected to the juncture between one side of the tank circuit L1, C1 and the input circuit to the base of transistor T1.

The lower juncture of the tank circuit is connected to ground through capacitor C3 and to the base of another transistor T2 of the NPN type, the latter transistor serving as an electronic switch and controlling solenoid 40. One side of soledoid 40 is connected to plus terminal B+, and the other side of the solenoid is connected to the collector of transistor T2. The emitter of transistor T2 is connected to ground and to one side of a capacitor C5, the other side of the capacitor being connected to the transistor collector. In addition, a resistor R6 is interposed between the base of transistor T2 and ground, this resistor, together with resistor R5, serving as a voltage divider for the voltage applied to the base of transistor T2. Another resistor R7 is connected between B− and the emitter of transistor T2.

The operation of the device is as follows: Under normal conditions, transistor T1 oscillates at the frequency controlled by the L–C constant of inductance L1 and capacitance C1. The circuit is arranged so that the output of transistor T1, which is applied to the base of transistor T2, is sufficiently negative to prevent conduction through transistor T2. Accordingly, transistor T2 does not conduct under these normal conditions, and no current will flow through solenoid 40. Therefore, the valve 50 controlled by solenoid 40 is not actuated, and no water will flow through tap 55.

Now, when the user wishes to automatically turn the tap on, he positions his hand or hands close to sensing element S. This causes an increase in the capacitance of S, and thereby decreases the impedance of the shunt circuit including S and R1. The output amplitude and Q of the tank circuit L1, C1 is thus made smaller, which produces a lower amplitude output from transistor T1. This output is applied to the base of transistor T2, making the base less negative, and causing the transistor to conduct. When the transistor is thus made to conduct, current from B+ is passed through solenoid 40, causing the solenoid to actuate valve 50 to open the water tap 55. Thus, water flows from the tap.

The water will continue to flow until the user removes his hand. When this occurs, the capacitance of sensing element S is reduced to its initial value, increasing the Q of the tank circuit, increasing the amplitude of the output from transistor T1, making the base of transistor T2 more negative, and thereby terminating the conduction through transistor T2. Current therefore ceases to flow through solenoid 40, and the valve 50 returns to its normal closed position.

In the circuit of FIG. 2, means are provided for stabilizing the operation of the system particularly with respect to possible temperature fluctuations. Thus, resistor R1 in the shunt circuit is made to be thermally responsive so that its resistance decreases with an increase in temperature. Also, sensing element S is provided with a bimetallic element 9 proximate to the pair of electrode surfaces 6 and 8 for stabilizing the capacitance of the sensing element against temperature fluctuations. Electrode 9 is arranged so that it moves closer to electrode surfaces 6 and 8 when the temperature rises, and moves away from these surfaces when the temperature falls.

Further, transistor T1 is provided with a thermally responsive resistor R4 coupled between its base and its collector, to stabilize the operation of the transistor against temperature fluctuations.

The purpose of capacitor C5 is to act as an A-C bypass to ground and also to introduce a slight time delay to the operation of the circuit so that the valve will not be turned on should a short transient condition occur.

Figure 3:
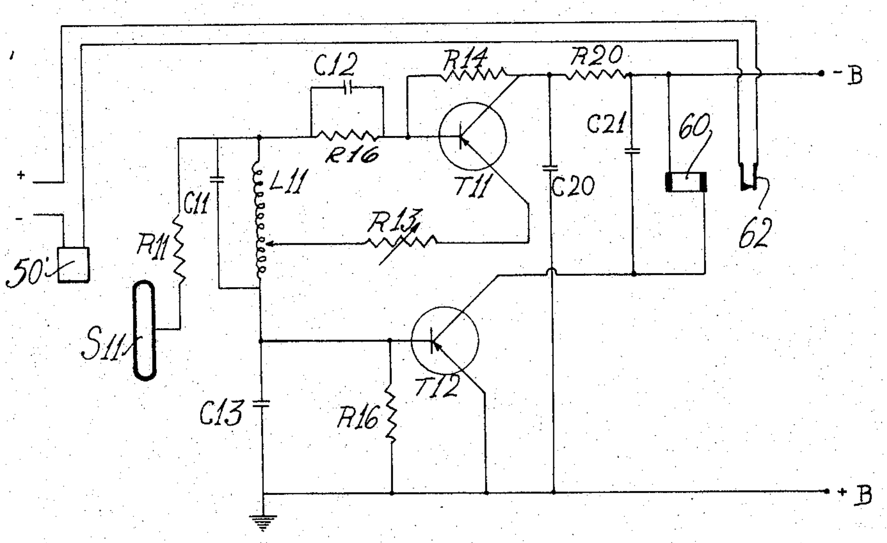
FIG. 3 is a circuit diagram of another system constructed in accordance with the invention.
Figure 4:
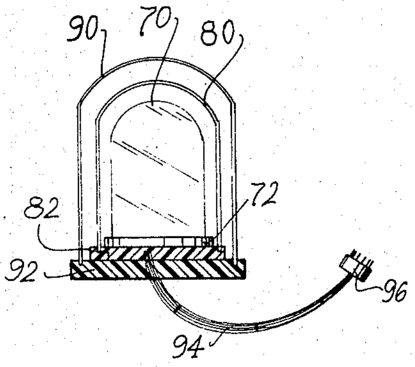
FIG. 4 illustrates an electrical circuit, such as that of FIG. 3, in miniaturized form wherein its circuit elements are enclosed within three spaced, sealed housings to protect against temperature fluctuations.

FIG. 3 illustrates another embodiment of the invention particularly susceptible to miniaturization. In this embodiment, a PNP transistor is used for the electronic switch, and also the temperature compensating elements (i.e. resistors R1 and R4 and bi-metallic element 9) are omitted, and instead the circuit elements are enclosed in a plurality of housings (FIG. 4 illustrates three) to protect against outside temperature fluctuations.

In FIG. 3, sensing or probe element S11 is in the form of a loop of conductive material and is connected to resistor R11 through tank circuit C11, L11, and then to ground through capacitor C13. The oscillator includes transistor T11, the collector of which is connected to B−. Its emitter is connected to inductance L11 through variable resistor R13. A further resistor R14 is connected between the base and the collector of transistor T11. Base current bias is provided by capacitor C12 and resistor R12.

In this embodiment, resistors R14 and R11 need not be thermally sensitive, as in the FIG. 2 circuit, since this circuit is made to be relatively temperature insensitive by the enclosure arrangement illustrated in FIG. 4, as will be described below.

Also in this embodiment a PNP transistor T12 is used for the electronic switch. The base of transistor T12 is connected to the juncture of the tank circuit L11, C11 with capacitor C13, and a resistor R16 is connected across the base and the emitter of the transistor. The collector of the transistor is connected to B− through a relay 60 whose contacts 62 are in a circuit which controls a solenoid-actuated valve 50′. A high-frequency filter network R20, C20, is connected between B− and B+, and an A.C. bypass capacitor C21 is connected across relay coil 60.

The arrangement is such that normally the base of transistor T12 is negative so that it conducts, whereby current flows through relay 60. Relay contacts 62 are biased so as to be closed when no current flows in the relay winding and opened when the relay winding is energized. Accordingly, under these normal conditions, contacts 62 will be opened, whereby solenoid-valve 50′ will be in its non-actuated (i.e. closed) condition.

As soon as the user places his hands close to sensing element S11, the output amplitude from oscillator T11 drops, and the base of transistor T12 becomes less negative. This reduces or interrupts the flow of current through the transistor, and thereby through relay 60, permitting the latter's contact 62 to close and thereby to actuate solenoid-valve 50′. As soon as the user removes his hands, the circuit is normalized to its original condition and valve 50′ is returned to its open condition.

As indicated earlier, the system in FIG. 3 is particularly suitable for miniaturization since it does not include the temperature compensating elements of the FIG. 2 circuit. To make the circuit of FIG. 3 relatively insensitive to temperature fluctuations, however, it is disposed within a plurality of housings, the first being housing 70. Base 72 of housing 70 carries the circuit components and is hermetically sealed, as by wax, to the housing, which is in turn disposed within and spaced from a second housing 80 also having a base 82 hermetically sealed thereto as by wax. If desired, the assembly may be disposed within a third housing 90 spaced from housing 80 and having a similarly hermetically sealed base 92. A moisture-absorbing material may be placed between one or both adjacent pairs of housings. The electrical components within the assembly are connected to leads 94 passing through the three bases and connected to a connector 96.

It has been found that the circuit of FIG. 3 housed as illustrated in FIG. 4 is relatively insensitive to a wide range of ambient temperatures.

It will be appreciated that the described systems can be used in many other applications, for example for opening doors in response to the presence of a person, for burglar-detecting, for measuring liquid levels, and in many other applications where the proximity or presence of an object is sensed for operating or controlling an external device.

It is therefore to be understood that the described embodiments of the invention are illustrative only, and that many other embodiments, variations, and applications of the invention, or the several features thereof disclosed, may be made without departing from the spirit or scope of the invention as defined in the following claims.

I claim:

1. A system sensitive to the proximity of an extraneous object for controlling an external device, comprising an electrical circuit including an oscillator and a tank circuit for controlling the frequency of the oscillator, a shunt across said tank circuit, a probe in said shunt for sensing the proximity of the extraneous object, and a resistor in said shunt connected between said tank circuit and said probe, said probe changing the Q of the tank circuit in response to the proximity of the extraneous object to produce a change in amplitude in the output of said oscillator, and control means responsive to the said change in output amplitude to control the external device.

2. A system as defined in claim 1, wherein said probe is a capacitive probe, and wherein said oscillator includes a transistor, said tank circuit being connected between the emitter and base of said transistor, one side of said resistor being connected to the juncture between one side of said tank circuit and the input circuit to said base, the other side of said resistor being connected to said capacitive probe.

3. A system as defined in claim 1, wherein said probe includes a bi-metallic element proximate thereto for stabilizing the circuit against temperature fluctuations.

4. A system as defined in claim 1, wherein said resistor in said shunt is a thermally responsive resistor the resistance of which varies with temperature.

5. A system as defined in claim 2, wherein said transistor includes a thermally responsive resistor connected across the collector and base thereof.

6. A system as defined in claim 2, wherein said control means comprises a second transistor normally biased to cut-off and effective to conduct upon the occurrence of said change in amplitude in the output of said oscillator.

7. A system as defined in claim 2, wherein said control means comprises a second transistor normally biased to conduct and effective to be cut-off upon the occurrence of said change in amplitude in the output of said oscillator.

8. A system as defined in claim 1, wherein said electrical circuit is disposed within a first sealed housing, the latter being disposed within a second sealed housing spaced from said first housing, said second housing being disposed within a third sealed housing spaced from said second housing.

9. A system as defined in claim 1, wherein said external device is a valve controlling a water tap and actuated to open upon detection of the proximity of the user's hand and to close when same is removed.

References Cited

UNITED STATES PATENTS

| | | | |
|---|---|---|---|
| 2,917,732 | 12/1959 | Chase et al. | 340—38 X |
| 3,032,722 | 5/1962 | Banasiewicz | 331—10 |
| 3,067,364 | 12/1962 | Rosso | 317—148.5 |
| 3,129,415 | 4/1964 | McKnight | 340—258 |
| 3,199,096 | 8/1965 | Bagno | 340—258 |

FOREIGN PATENTS

| | | |
|---|---|---|
| 668,374 | 3/1952 | England. |

OTHER REFERENCES

IBM Technical Disclosure Bulletin, vol. 6, No. 5, October 1963, pp. 24, 25.

Radio-Electronics, June 1950, p. 42, "Automatic Intercom Switch," by E. Aisberg.

MILTON O. HIRSHFIELD, *Primary Examiner.*

J. A. SILVERMAN, *Assistant Examiner.*